March 25, 1924. 1,488,120
C. R. HUBBARD
MACHINE FOR SKIVE SPLITTING ANNULAR ARTICLES
Filed June 21, 1923
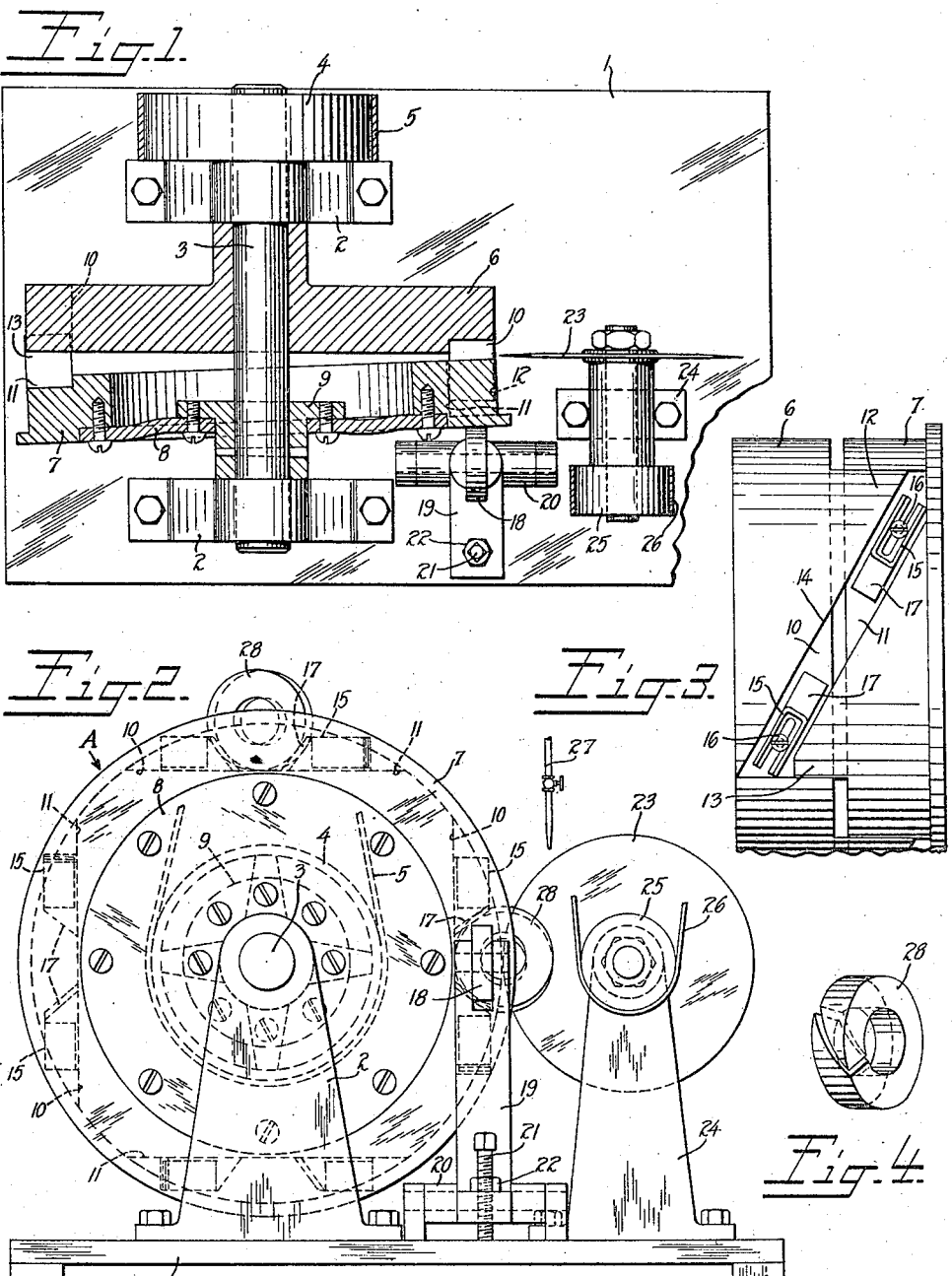
Inventor
CECIL R. HUBBARD
By his Attorney Patented Mar. 25, 1924.

1,488,120

UNITED STATES PATENT OFFICE.

CECIL R. HUBBARD, OF CLEVELAND, OHIO, ASSIGNOR TO THE MECHANICAL RUBBER COMPANY, OF CLEVELAND, OHIO, A CORPORATION OF NEW JERSEY.

MACHINE FOR SKIVE-SPLITTING ANNULAR ARTICLES.

Application filed June 21, 1923. Serial No. 646,766.

*To all whom it may concern:*

Be it known that I, CECIL R. HUBBARD, a citizen of the United States, residing at Cleveland, county of Cuyahoga, State of Ohio, have invented a certain new and useful Improvement in a Machine for Skive-Splitting Annular Articles, of which the following is a full, clear, and exact description.

This invention relates to a machine for skive splitting annular articles, more particularly to a machine for splitting articles such as packing rings with an inclined or skive cut.

The use of split rings for many purposes is very wide-spread in the arts, such rings being extensively used where it is desired to place them around a shaft rod or other member without sliding them over the end of same. For certain purposes a radial cut or split is satisfactory, but for packing rings and similar articles where a tight joint is required it is necessary for the cut to be an inclined or skived one. Prior to my invention such skive cut has been produced in a relatively slow and tedious manner by using a circular knife on a lathe.

An object of my invention is to provide an improved machine for rapidly and accurately skive cutting or splitting annular articles.

Another object is to provide a machine for automatically gripping and presenting annular objects in skive cutting position to a cutting element.

Still another object is to provide a machine in which there will be no danger of injury to the operator when feeding objects to be cut.

For a detailed disclosure of the invention reference is had to the accompanying specification and drawings, in which latter:

Fig. 1 is a plan view, partially in section, of the machine;

Fig. 2 is a side elevation thereof;

Fig. 3 is a fragmentary end view, and

Fig. 4 is a perspective of the product of the machine.

Referring to the drawings, the numeral 1 designates a base on which are mounted bearing brackets 2, in which latter is journalled a shaft 3 provided with a pulley 4 driven from the belt 5. Rigidly secured on the shaft is a disc 6 forming one element of a gripping and positioning means for the article to be split, which latter in the present instance is shown as a packing ring. A second gripping element 7 is also in the form of a disc having secured thereto a flexible disc 8 of rubber, rubber and fabric, or any other suitable material, which latter is connected to a hub 9 fast on the shaft 3. It is obvious that any other suitable flexible and resilient mounting for the disc 7 may be provided. The disc 6 is provided at intervals on its periphery with substantially triangular flattened or cut away portions 10, and cooperating with each of said portions is a similar cut away portion 11 on the disc 7, but having its apex oppositely directed. Adjacent each cut away portion 10 the disc 6 is provided with a substantially triangular projection 12 which overhangs the adjacent cut away portion 11 of disc 7 in the manner shown in Fig. 3. The disc 7 is also provided with substantially triangular projections 13, each of which overhangs a cut away portion 10 on the disc 6. It will be seen from an inspection of Fig. 3 that each cooperating pair of projections and cut away portions form an article receiving recess or slot 14 extending across the peripheries of the discs 6 and 7 and inclined to their plane of rotation. Secured on each cut away portion 10 within the slot 14 is a guide 15 which may be adjusted longitudinally of the slot by a pin and slot connection 16, while secured on each cut away portion 11 within the slot 14 is a similar guide 15, and the opposed faces of these guides are inclined as shown at 17 to form a rest for the object to be cut. It will be apparent that by adjusting the guides 15 toward or from each other they can be made to accommodate rings of various diameters. In the present instance four slots 14 are shown, but the number can be varied as desired.

Adjacent the disc 7 a cam roller 18 is disposed, which roller is mounted on the vertical arm of an L-shaped support 19, the latter being pivotally connected to the base 1 at 20. Threaded in the horizontal arm of the support 19 is an adjusting screw 21 adapted to bear against the base, which screw may be held in adjusted position by means of the lock nut 22. It will be apparent that by adjusting the cam roller 18 toward or from the disc 7 the latter will be inclined at various angles to its plane of rotation, the resilient connecting disc 8 at all times resisting such displacement of the disc 7.

Disposed opposite the gap between discs 6 and 7 is a cutting element 23, in the present instance in the form of a rotary cutter, which is mounted in a bearing bracket 24, secured to the base 1, the cutter being driven by the pulley 25 from belt 26. When cutting rings having rubber in their composition water may be supplied to the cutter disc 23 by means of a valve controlled pipe 27.

In operation the cutter is driven at high speed while the discs 6 and 7 are rotated at a speed slow enough to allow the operator to feed thereto the articles to be cut. It will be seen that adjacent the cutting point the disc 7 is displaced to the greatest extent toward the disc 6, while at a point diametrically opposite the disc 7 is at the greatest distance away from the disc 6. At about the point marked A in Fig. 2 the operator places a packing ring 28 or other article to be cut between the guides 15 in the slot 14 and as this ring passes the highest point in its rotation it is gripped between the walls of the slot 14 by the inclination of the disc 7 and presented to the cutter 23 in an inclined position, so that the latter makes a skived cut through the ring in the manner shown in Fig. 4. As the ring approaches the bottom point in the rotation of the discs 6 and 7, the latter begins to move sufficiently away to release the packing ring, which then drops into a suitable receptacle. As before pointed out the guides 15 may be longitudinally adjusted to accommodate rings 28 of varying diameters, and by adjusting the cam roller 18 the inclination of disc 7 may be varied to grip packing rings of different thicknesses.

It is obvious that any suitable means for resiliently connecting the disc 7 to the shaft 3 may be employed, and any other suitable cutting device may be substituted for that shown. It will be apparent that the capacity of the machine is limited only by the facility with which the operator can place the articles in the guides 15, which operation can be performed very rapidly, and that owing to the fact that the rings to be cut are positioned in the gripping members at a distance from the cutting element there is no risk whatever of injury to the operator by the cutting element through carelessness. It will be seen that by my invention there is provided a simple, rapid, and economical means for performing the desired operation, and while in the present embodiment the invention has been shown as applied to the cutting of packing rings, it is obvious that it may be used for giving a skive cut or split to rings of various kinds. With the disclosure herein given many modifications will suggest themselves to those skilled in the art, and it therefore is not desired to limit the invention otherwise than as set forth in the appended claims.

Having thus described my invention, what I claim and desire to protect by Letters Patent is:

1. A machine for skive splitting annular articles comprising rotatable complementary gripping means for holding an annular article inclined to the plane of rotation, and cutting means in the path of said article and movable in a plane parallel to the plane of rotation.

2. A machine for skive splitting annular articles comprising adjacent rotatable gripping members having complementary inclined peripheral gripping elements, means for separating said elements at one point in their rotation and for approaching them at another, and cutting means adjacent the periphery of said members and operating in a plane parallel to their plane of rotation.

3. A machine for skive splitting annular articles comprising adjacent rotatable gripping members mounted on a common axis, means for inclining one of said members on its axis, adjustable inclined complementary peripheral article positioning means carried by said members, and cutting means disposed perpendicularly to the axis of said members.

4. A machine for skive splitting annular articles comprising complimentary rotatable article gripping members, means carried thereby for positioning the articles at an angle to the plane of rotation, means for actuating said members to grip an article during part of a rotation and released during another part thereof, and cutting means disposed in the path of the articles.

5. A machine for skive splitting annular articles comprising complementary rotatable and relatively movable article gripping members, means for imparting such relative movement to grip an article during part of a rotation and release it during another part thereof, and means for skive cutting the gripped articles.

6. A machine for skive splitting annular articles comprising complementary rotatable and relatively movable article gripping members, means carried thereby for positioning the articles at an angle to the plane of rotation, means for relatively moving said members to grip an article during part of a rotation and release it during another part thereof, and cutting means disposed in the path of the article and parallel to the plane of rotation.

7. A machine for skive splitting annular articles comprising complementary article gripping members rotatable in unison, one of said members being resiliently mounted, means for inclining said last member with respect to the other to grip an article, means for angularly disposing the gripped articles with respect to the plane of rotation, and cutting means in the path of the articles.

8. A machine for skive splitting annular articles comprising complementary gripping members respectively fixedly and resiliently mounted on a shaft, means for rotating the latter, adjustable means for inclining said resiliently mounted member with respect to the shaft, means peripherally carried by said gripping members for holding an article in an inclined position with respect to the plane of rotation, and cutting means operating parallel to the plane of rotation.

9. A machine for skive splitting annular articles comprising a disc rigidly mounted on a shaft, a coacting disc flexibly mounted thereon, said discs having complementary cut away peripheral portions and overhanging projections forming inclined article receiving slots, guides disposed in said slots, a cam roller coacting with said flexibly mounted disc to incline it on its axis, and means for cutting the article.

10. A machine for skive splitting annular articles comprising a disc rigidly mounted on a shaft, a coacting disc flexibly mounted thereon and spaced therefrom, said discs having complementary cut away peripheral portions and overhanging projections forming inclined article receiving slots, adjustable guides disposed in said slots, an adjustable cam roller coacting with said flexibly mounted disc to incline it on its axis, and a rotary cutter in alignment with the space between said discs and adjacent their peripheries.

Signed at Cleveland, county of Cuyahoga, State of Ohio, this 18th day of June, 1923.

CECIL R. HUBBARD.